(12) United States Patent
Manglani et al.

(10) Patent No.: US 11,619,727 B2
(45) Date of Patent: Apr. 4, 2023

(54) DETERMINING MULTI-DEGREE-OF-FREEDOM POSE FOR SENSOR CALIBRATION

(71) Applicant: Ford Global Technologies, LLC, Dearborn, MI (US)

(72) Inventors: Sagar Manglani, Los Altos, CA (US); Punarjay Chakravarty, Campbell, CA (US); Shubham Shrivastava, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 257 days.

(21) Appl. No.: 16/914,975

(22) Filed: Jun. 29, 2020

(65) Prior Publication Data

US 2021/0405168 A1 Dec. 30, 2021

(51) Int. Cl.
*G01S 7/497* (2006.01)
*G01S 17/74* (2006.01)
*G01S 7/48* (2006.01)
*G01S 13/86* (2006.01)

(52) U.S. Cl.
CPC .......... *G01S 7/4972* (2013.01); *G01S 7/4802* (2013.01); *G01S 13/867* (2013.01); *G01S 17/74* (2013.01)

(58) Field of Classification Search
CPC .... G01S 7/4972; G01S 7/4802; G01S 13/867; G01S 17/74
See application file for complete search history.

(56) References Cited

U.S. PATENT DOCUMENTS

| 10,698,067 | B2 * | 6/2020 | Remelius | A61B 5/1114 |
| 11,195,353 | B2 * | 12/2021 | Nix | G01S 7/4813 |

(Continued)

FOREIGN PATENT DOCUMENTS

| CN | 103279949 B | 10/2015 |
| CN | 105785989 B | 12/2018 |
| KR | 102054455 B1 | 12/2019 |

OTHER PUBLICATIONS

Hugh Durrant-Whyte, et. al., "Simultaneous Localisation and Mapping (SLAM): Part I The Essential Algorithms'" (9 pages).

(Continued)

*Primary Examiner* — Bryan Bui
(74) *Attorney, Agent, or Firm* — Frank A. MacKenzie; Bejin Bieneman PLC (57) ABSTRACT

A calibration device and method of calculating a global multi-degree of freedom (MDF) pose of a camera affixed to a structure is disclosed. The method may comprise: determining, via a computer of a calibration device, a calibration device MDF pose with respect to a global coordinate system corresponding to the structure; receiving, from an image system including the camera, a camera MDF pose with respect to the calibration device, wherein a computer of the image system determines the camera MDF pose based on an image captured by the camera including at least a calibration board affixed to the calibration device; calculating the global MDF pose based on the calibration device MDF pose and the MDF pose; and transmitting the global MDF pose to the image system such that a computer of the image system can use the global MDF pose for calibration purposes.

20 Claims, 7 Drawing Sheets

(56) References Cited

U.S. PATENT DOCUMENTS

2020/0408887 A1* 12/2020 Zeng .................. G01S 17/87
2021/0383167 A1* 12/2021 Chakravarty ............ G06N 3/08

OTHER PUBLICATIONS

Open Source Computer Vision (OpenCV), "Detection of ArUco Markers" retrieved from URL: https//docs.opencv.org/trunk/d5/dae/tutorial_aruco_detection.html (15 pages).

* cited by examiner

DETERMINING MULTI-DEGREE-OF-FREEDOM POSE FOR SENSOR CALIBRATION

BACKGROUND

Autonomous vehicles can execute computer-controlled steering and speed-control based on sensor input. Among other things, the vehicle may use GPS data to determine a navigation path. In the absence of GPS data, the vehicle may cease autonomous operation due to a lack of information regarding its surroundings.

BRIEF DESCRIPTION OF THE DRAWINGS

FIGS. 5A through 6B illustrate example diagrams of various implementations of the calibration device of FIG. 4.

DETAILED DESCRIPTION

A calibration device and method of calculating a global multi-degree of freedom (MDF) pose of a camera affixed to a structure is disclosed. The method may comprise: determining, via a computer of a calibration device, a calibration device MDF pose with respect to a global coordinate system corresponding to the structure; receiving, from an image system including the camera, a camera MDF pose with respect to the calibration device, wherein a computer of the image system determines the camera MDF pose based on an image captured by the camera including at least a calibration board affixed to the calibration device; calculating the global MDF pose based on the calibration device MDF pose and the MDF pose; and transmitting the global MDF pose to the image system such that a computer of the image system can use the global MDF pose for calibration purposes.

According to the method example set forth above and/or according to any of the other examples set forth above, the method further comprising receiving a command to navigate to a new waypoint.

According to the method example set forth above and/or according to any of the other examples set forth above, wherein the camera is a red-green-blue-depth (RGBD) camera.

According to the method example set forth above and/or according to any of the other examples set forth above, wherein the computer of the image system determines the camera MDF pose using a deep neural network that receives an input image including image data representative of the calibration board.

According to the method example set forth above and/or according to any of the other examples set forth above, wherein the deep neural network is a convolutional neural network (CNN).

According to the method example set forth above and/or according to any of the other examples set forth above, wherein an input layer of the CNN receives the images, wherein an output layer of the CNN yields the MDF pose.

According to the method example set forth above and/or according to any of the other examples set forth above, wherein the calibration board includes one or more grid arrays.

According to the method example set forth above and/or according to any of the other examples set forth above, wherein the one or more grid arrays are arranged to form a fiducial marker.

According to the method example set forth above and/or according to any of the other examples set forth above, wherein the calibration board includes a light source that emits electromagnetic radiation via the fiducial marker.

According to the method example set forth above and/or according to any of the other examples set forth above, wherein determining the calibration device MDF pose further comprises determining the calibration device MDF pose based on sensor data captured by at least one sensor, wherein the sensor data is representative of an environment external to the calibration device.

According to at least one additional illustrative example, a calibration device is described. The calibration device may comprise: a calibration board; at least one sensor arranged to capture environment data external to the calibration device; a wireless transceiver; and a computer communicatively coupled to the at least one sensor and the transceiver, wherein the computer comprises one or more processors and memory storing instructions executable by the one or more processors to cause the one or more processors to: determine a calibration device MDF pose with respect to a global coordinate system corresponding to a structure based on the environment data captured by the at least one sensor; receive, from an image system including a camera, a camera MDF pose with respect to the calibration device, wherein a computer of the image system determines the camera MDF pose based on an image captured by the camera including at least the calibration board; calculate the global MDF pose based on the calibration device MDF pose and the MDF pose; and transmit the global MDF pose to the image system such that a computer of the image system can use the global MDF pose for calibration purposes.

According to the at least one example set forth above, the instructions further cause the one or more processors to receive a command to navigate to a new waypoint.

According to the at least one example set forth above, the camera is a red-green-blue-depth (RGBD) camera.

According to the at least one example set forth above, the computer of the image system determines the camera MDF pose using a deep neural network that receives an input image including image data representative of the calibration board.

According to the at least one example set forth above, the deep neural network is a convolutional neural network (CNN).

According to the at least one example set forth above, wherein an input layer of the CNN receives the one or more images, wherein an output layer of the CNN yields the MDF pose.

According to the at least one example set forth above, wherein the calibration board includes one or more grid arrays.

According to the at least one example set forth above, wherein the one or more grid arrays are arranged to form a fiducial marker.

According to the at least one example set forth above, wherein the calibration board includes a light source that emits electromagnetic radiation via the fiducial marker.

According to the at least one example set forth above, wherein the at least one sensor comprises a lidar sensor.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Some structures can include multiple edge devices, or image systems, that can be used to assist computer vision algorithms within vehicles traversing the structure. Typically, the edge devices calculate a multi-degree-of-freedom (MDF) pose of the vehicle and use the calculated MDF pose to determine whether particular objects may be within a path of the vehicle. Within the deployed environment, the cameras may require calibration. However, manual calibration may require a large number of hours of skilled labor and structure downtime.

The present disclosure describes a calibration device that can be used to traverse the structure. The calibration device can determine an MDF pose of the calibration device relative to a global coordinate system based on the structure. The calibration device can further calculate a global MDF pose of a camera based on a determined MDF camera pose provided to the calibration device. The global MDF pose can be used by the camera for calibration purposes.

Figure 1:
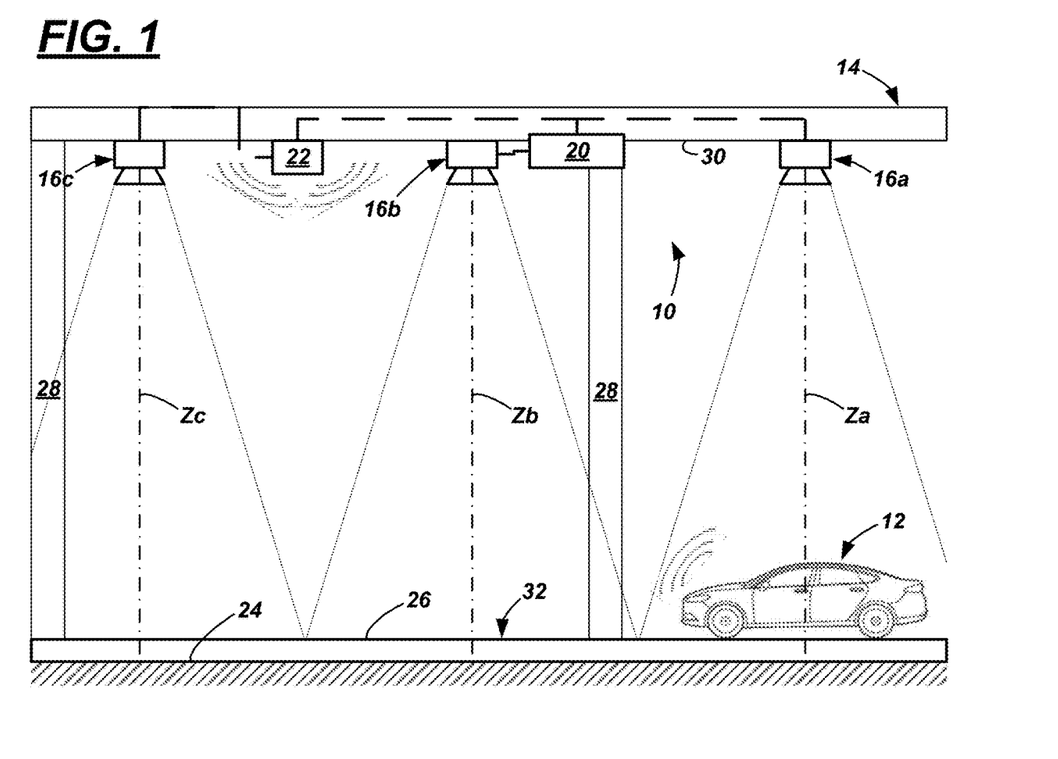
FIG. 1 is a schematic diagram of a structure comprising an imaging system that is used to assist with vehicle navigation.

Turning now to the figures, wherein like reference numerals indicate like or similar features and/or functions, an image system 10 for guiding a vehicle 12 is shown in FIG. 1. The image system 10 is coupled to a structure 14 (e.g., such as a parking garage) and comprises a plurality of electronic depth cameras 16a, 16b, 16c, at least one computer 20 that processes data from the cameras 16a, 16b, 16c, and at least one wireless transceiver 22 used to communicate with the vehicle 12.

A respective optical axis (Za, Zb, Zc) corresponding to each camera 16a, 16b, 16c is normal to (or plumb with respect to) the ground (or Earth) 24 (e.g., in FIG. 1, each optical axis (Za, Zb, Zc) also is normal to a floor 26 of the structure 14 as well. Image system 10 may be useful when a satellite-based positioning signal is too weak to be used successfully by vehicle-navigation equipment (e.g., inside some parking garages) e.g., in these circumstances, available localization data (typically determined by the vehicle's computing systems) may be inadequate to navigate the vehicle 12. Hence, the image system 10 may determine suitable localization data on behalf of the vehicle 12. As explained below, camera 16a may capture one or more images that include at least a portion of vehicle 12, and computer 20 (using a deep neural network) may determine a multi-degree-of-freedom (MDF) pose of the vehicle 12—e.g., typically, this is a six-degree-of-freedom (6DOF) pose; however, this quantity is not required. Using the image(s) and this MDF pose information, the computer 20 may determine the vehicle's position in the structure relative to obstacles therein (e.g., such as other vehicles, pillars 28 in the structure 14, etc.), as well as waypoint data by which to instruct the vehicle 12 to navigate. Computer 20 may send a navigation command to the vehicle 12 via the wireless transceiver 22, and the vehicle 12 may move within the structure 14 according to the command. This process may be repeated throughout the field of view (FOV) of camera 16a. And when vehicle 12 enters the FOV of camera 16b, a hand-off may occur, and a similar process may be executed using camera 16b and computer 20—thereby enabling the vehicle 12 to continue to navigate through another region of the structure 14.

A calibration device 400, illustrated in FIG. 4 and described in greater detail below, can be used to calibrate the image system 10. The calibration device 400 can be a portable device that can transitioned throughout the structure 14. As the calibration device 400 is transitioned throughout the structure 14 environment, the calibration device 400 can establish communication with each image system 10 to perform calibration.

Turning to FIG. 1, the illustrated vehicle 12 is a passenger vehicle; however, this is merely one example. Vehicle 12 instead could be a truck, a sports utility vehicle (SUV), a recreational vehicle, a bus, or any other suitable vehicle that comprises an autonomous driving computer. For example, the Society of Automotive Engineers (SAE) (which has defined operation at levels 0-5). More particularly, vehicle 12 may comprise one or more computers (not shown) configured to store and execute logic instructions or sets of instructions embodied in hardware, software, firmware, a combination thereof, or the like to thereby enable vehicle 12 to operate with some user assistance (partial autonomy) or without any user assistance (full autonomy). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, the steering control mode of vehicle 12 includes operation of the vehicle 12 at SAE level 5 (operation in a fully autonomous mode)—e.g., at least within structure 14.

Structure 14 is shown as a parking garage having a ceiling 30, a floor 26, and multiple pillars 28 which support the ceiling 30 relative to floor 26. The floor 26 and ceiling 30 may or may not be level with respect to ground 24 and may or may not be parallel to one another. In general, at least some regions of structure 14 may be devoid of a useful satellite-based positioning signal (i.e., absent a satellite-based positioning signal or alternatively, the satellite positioning signal is present but weak). Weak may be defined as being attenuated and being less than a threshold; e.g., the threshold may be below a predetermined value that is usable by vehicle-navigation equipment. According to an example, the satellite-based positioning signal may be a wireless signal from a satellite using global positioning system (GPS), global satellite navigation system (GLONASS), or the like.

According to one example, each of the electronic depth cameras 16a, 16b, 16c may be similar or identical. Therefore, only one (16a) will be described in detail. It should be appreciated that any quantity of electronic depth cameras can be used (three are shown only by way of example).

Electronic depth camera 16a may be any suitable electronic camera which is capable of receiving depth data; i.e., a range between the camera 16a and a surface of an object within the field of view of the camera 16a. One non-limiting example of electronic depth camera 16a is a red-green-blue-depth (RGBD) camera, such as that shown in FIG. 2. For example, camera 16a may comprise a housing 40 that may be couplably fixed to ceiling 30 of structure 14, an optical assembly 42 carried by the housing 40, wherein optical axis Za is the optical axis of optical assembly 42, one or more infrared (IR) emitters 44 (only one is shown for purposes of illustration), and one or more infrared (IR) depth sensors 46 (only one is shown for purposes of illustration). By way of example, the optical assembly 42 may comprise a photosensitive array 48 and one or more lens (not shown) within the housing 40 and aligned along the optical axis Za. In operation, the camera 16a determines one or more images (e.g., image frames), and each image frame comprises color information and depth information corresponding to objects within the image frame. For example, the photosensitive array 48 may receive color image data while concurrently the IR emitters 44 and IR depth sensors 46 are used to determine depth image data; and ultimately a processor (not shown) of the camera 16a correlates both color image data and depth image data into an image which is provided to computer 20 (as described below). A couple non-limiting commercial examples of RGBD cameras are the Astra S 3D Camera by Orbbec and the Realsense D435 by Intel; other examples exist. In some implementations of image system 10, an RGBD camera is desirable as RGBD cameras typically have a front focal distance (FFD) between 2 and 5 meters (e.g., as opposed to lidar systems which typically have an FFD in the hundreds of meters). Further, RGBD cameras may cost substantially less than lidar systems.

Each of cameras 16a, 16b, and 16c may be mounted to ceiling 30 or other features of structure 14 so that the respective optical axes Za, Zb, Zc are plumb with respect to ground 24. According to one example, cameras 16a, 16b, 16c may be spaced from one another so as to minimize overlap of their respective FOVs. According to the example shown in FIG. 1, when vehicle 12 is centered within the FOV of camera 16a, vehicle 12 is not within the FOVs of cameras 16b and 16c and camera 16a can determine six-degree-of-freedom pose detection. According to another example, the overlap is not minimized. For example, the overlap of the respective FOVs may be up to the length of vehicle 12 (e.g., where there is full coverage of the vehicle 12 at the height thereof). Other overlap examples also exist. Multiple cameras 16a-16c may be electrically coupled to computer 20 (e.g., at least communicatively coupled).

Figure 2:
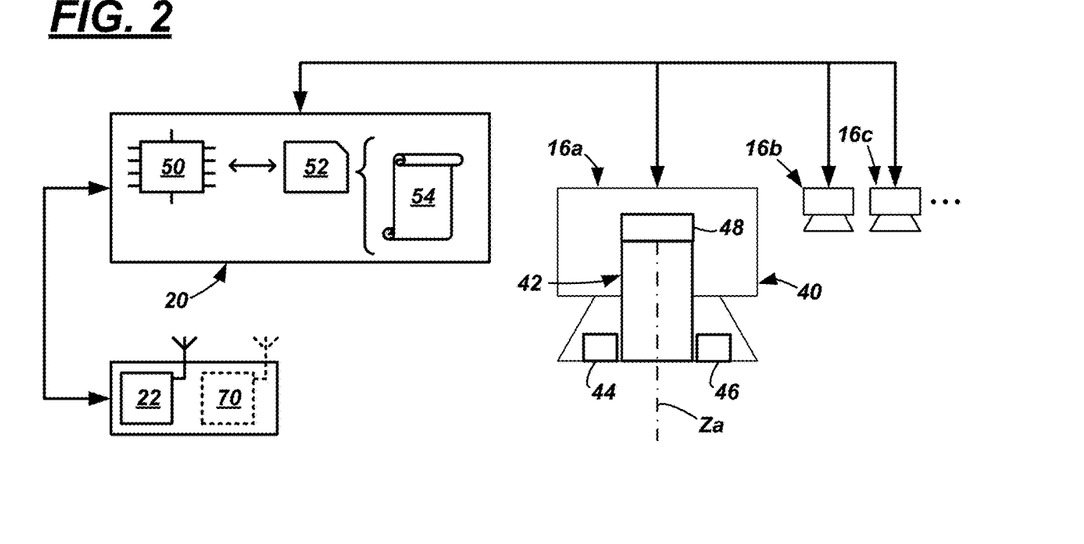
FIG. 2 is a schematic diagram of exemplary components of the imaging system of FIG. 1, the components including a plurality of electronic depth cameras, at least one computer that receives camera data from the plurality of electronic depth and uses the camera data to determine navigation data for a vehicle, and a wireless transceiver that is used for communication between the vehicle and computer.

Computer 20 may comprise one or more processors 50 (only one is shown in the diagram for purposes of illustration), memory 52, and a plurality of instructions 54 (by way of example only, software code) which is stored on memory 52 and which is executable by processor(s) 50. Processor(s) 50 may be programmed to process and/or execute digital instructions to carry out at least some of the tasks described herein. Non-limiting examples of processor(s) 50 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 50 read from memory 52 and execute multiple sets of instructions (e.g., including instructions 54) which may be embodied as a computer program product stored on a non-transitory computer-readable storage medium (e.g., such as memory 52). Non-limiting examples of instructions 54 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 52 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 52 may store one or more sets of instructions (e.g., such as instructions 54) which may be embodied as software, firmware, or other programming instructions executable by the processor(s) 50—including but not limited to the instruction examples set forth herein. In operation, processor(s) 50 may read data from and/or write data to memory 52.

Figure 3:
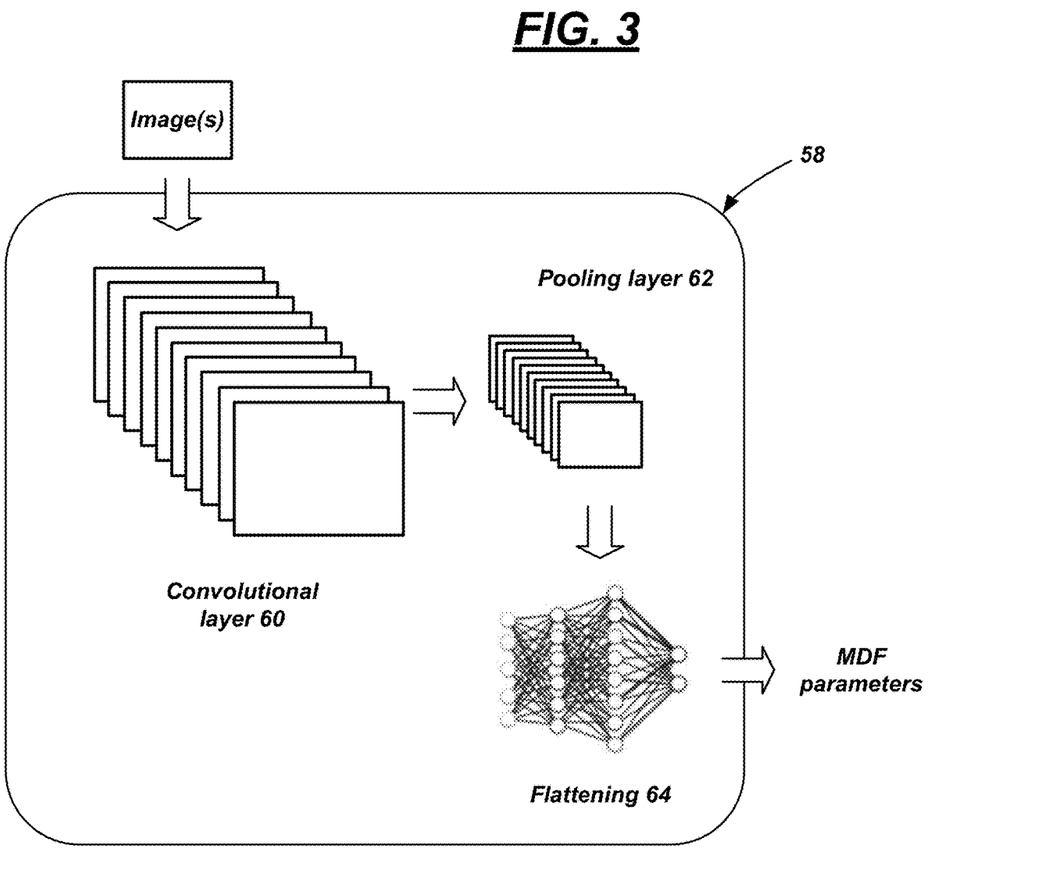
FIG. 3 is a schematic diagram illustrating an example of a deep neural network used to determine multi-degree-of-freedom (MDF) pose of a vehicle or a device.

The instructions 54 (stored in memory 52 and executable by processor(s) 50) may comprise any suitable set of instructions for carrying out the methods described herein. As described more fully below, the instructions 54 may include at least one deep neural network 58 (an example is shown in FIG. 3) that determines, from the one or more images, a multi-degree-of-freedom (MDF) pose of vehicle 12. The processor(s) 50 then may execute other instructions 54. E.g., using the MDF pose, processor(s) 50 may determine a two-dimensional (2D) projection of vehicle 12 onto the route 32 (or onto a deviation from route 32). Furthermore, processor(s) 50 may: determine potential interferences of vehicle 12 with objects within the structure 14 (pillars 28, walls, other features) by evaluating spacing of vehicle 12 with respect to such objects and a heading of vehicle 12 with respect to such objects (or projections thereof); determine a path that follows route 32 (or a deviation therefrom) to avoid collisions; determine another waypoint along the path that avoids collision of the vehicle with other objects; and communicate, using wireless transceiver 22, a command to vehicle 12 to move to the determined waypoint.

A wireless transceiver 22 may comprise a wireless chipset and matched antenna that facilitates short-range wireless communication links using protocols such as Bluetooth, Bluetooth Low Energy (BLE), Wi-Fi, Wi-Fi Direct, etc. Further, wireless transceiver 22 may be fixed to structure 14 and communicatively coupled to computer 20. In this manner, wireless transceiver 22 may be able to receive requests from vehicle 12 and pass them to computer 20 and/or receive commands from computer 20 and communicate the commands to vehicle 12.

While not shown, image system 10 may comprise multiple wireless transceivers 22. E.g., one or more wireless transceivers 22 may be respectively, communicatively coupled to a local computer 20. Spacing of the wireless transceivers 22 may be based upon signal strength within a predetermined region of the structure 14 and/or other factors.

In at least one example, image system 10 further may comprise a satellite-based positioning receiver 70 (FIG. 2) in communication with computer 20. In this manner, using the receiver 70, computer 20 may determine whether a satellite-based positioning signal is unsuitable (e.g., too attenuated) or is absent altogether. This aspect of system 10 is optional.

Deep neural network 58 (see FIG. 3) may be a convolutional neural network (CNN) adapted to classify vehicle pose based on the captured color image data and the captured depth image data (e.g., as inputs to the CNN). According to one non-limiting example, deep neural network 58 may comprise a convolutional layer 60, a pooling layer 62, and flattening 64. The convolutional layer 60 may receive image frames and convolve the image frames using a kernel or filter—e.g., yielding a plurality of convolved features. Thereafter, the pooling layers 62 may reduce the spatial size of the convolved features. Typically (although not required), there may exist multiple iterations of convolution followed by pooling. Thereafter, flattening 64 may convert the pooling output to a suitable column vector for input to a neural network, wherein classification occurs (e.g., using at least one predetermined neural network function, e.g., such as SoftMax)—the classification in the instant example pertaining to MDF pose. Other aspects and convolution techniques may be employed as well. In one or more implementations, the deep neural network 58 can determine an MDF pose of a calibration device, which is described in greater detail herein, based on a fiducial marker affixed to the calibration device. For instance, the deep neural network 58 receives, as input, an image including the fiducial marker. Based on the orientation of the fiducial marker, the deep neural network 58 can generate an MDF pose of the camera that captured the input image with respect to the fiducial marker.

While not shown, image system 10 may comprise multiple computers 20. E.g., such computers 20 may be networked together so computational tasks can be balanced and allocated as required.

Figure 4:
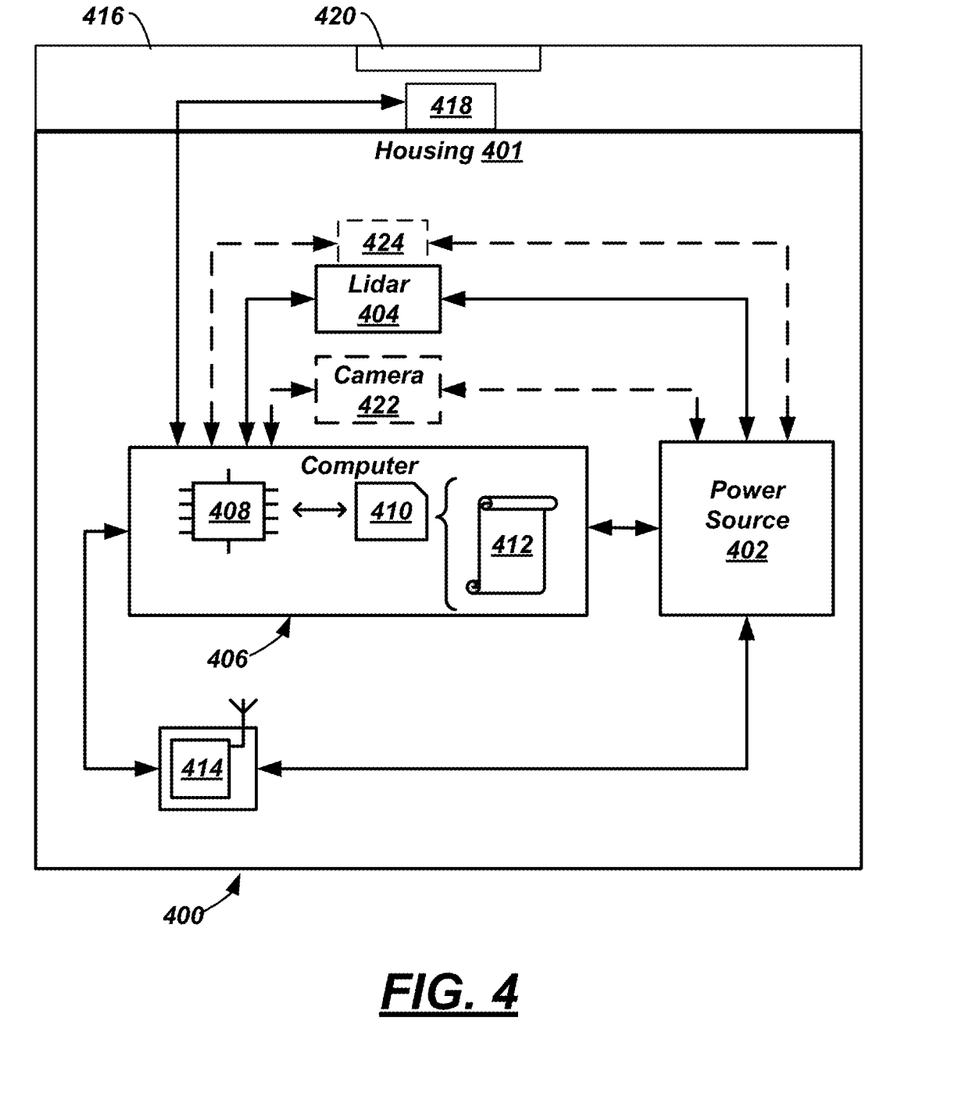
FIG. 4 is a schematic diagram illustrating an example calibration device according to an example implementation of the present disclosure.

FIG. 4 illustrates an example calibration device 400 according to an example implementation. As shown, the calibration device 400 includes a power source 402, a lidar sensor 404, and a computer 406. The components of the calibration device 400 also includes a housing 401 that houses, e.g., contains, the various components of the calibration device 400. In one or more implementations, the housing 401 may comprise a fiber composite structure, a space frame structure, or the like.

The power source 402 supplies power to the various components of the calibration device 400. For example, the power source 402 can supply power to the lidar sensor 404, the computer 406, and the other components of the calibration device 400 described herein. In various implementations, the power source 402 comprises a battery, such as a rechargeable lithium-ion battery. While not illustrated, it is understood that the calibration device 400 may include one or more voltage regulators and one or more DC-DC conversion circuits, such as a boost circuit, a buck circuit, or a boost/buck circuit, to convert power supplied by the power source 402.

The computer 406 may comprise one or more processors 408 (only one is shown in the diagram for purposes of illustration), memory 410, and a plurality of instructions 412 (by way of example only, software code) which is stored on memory 410 and which is executable by processor(s) 408. Processor(s) 408 may be programmed to process and/or execute digital instructions to carry out at least some of the tasks described herein. Non-limiting examples of processor(s) 408 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 408 read from memory 410 and execute multiple sets of instructions (e.g., including instructions 412) which may be embodied as a computer program product stored on a non-transitory computer-readable storage medium (e.g., such as memory 410). Non-limiting examples of instructions 412 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 410 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 410 may store one or more sets of instructions (e.g., such as instructions 412) which may be embodied as software, firmware, or other programming instructions executable by the processor(s) 408—including but not limited to the instruction examples set forth herein. In operation, processor(s) 408 may read data from and/or write data to memory 410. The instructions 412 (stored in memory 410 and executable by processor(s) 408) may comprise any suitable set of instructions for carrying out the methods described herein.

The computer 402 may be in communication with a wireless transceiver 414 fixed within the calibration device 400. The wireless transceiver 414 may comprise a wireless chipset and matched antenna that facilitates short-range wireless communication links using protocols such as Bluetooth, Bluetooth Low Energy (BLE), Wi-Fi, Wi-Fi Direct, etc. The wireless transceiver 414 can allow the computer 402 to communicate with the image system 10. For example, the computer 402 and the image system 10 may communicate with another for calibration purposes.

The calibration device 400 also includes a calibration board 416. The calibration board 416 can be external to the housing 401 or comprise an enclosure portion of the housing 401. The calibration board 416 may be oriented such that the imaging device(s) 10 can image data representative of the calibration board 416. For example, the calibration board 416 can be oriented such that the calibration board 416 is opposite a surface of the housing 401 that is oriented towards a ground, e.g., floor, of the structure 14.

The calibration board 416 can include a light source 418 and one or more planar grid arrays 420. The light source 418 can generate electromagnetic radiation, e.g., light. For example, the light source 418 generates diffuse light. The light source 418 can comprise one or more light emitting diodes (LED), an incandescent light, a fluorescent light, and the like, or some combination thereof, and may be used in combination with a light diffuser. The light source 418 can generate light in accordance with a display pattern. The display pattern is generated using one or more instructions that control light generation by the light source 418. In some implementations, the instructions control, e.g., a start time for generating light, a stop time for generating light, an intensity of generated light, other parameters relevant to generating light, or some combination thereof. The instructions may be set by an operator. The instructions may be stored as instructions 412 in the memory 414.

The one or more planar grid arrays 420 can include a plurality of fiducial markers in a grid-like pattern. In some embodiments, the fiducial markers are a small hole of a particular size such that, if backlit, the fiducial marker appears as a small light source. Each fiducial marker corresponds to a particular location in a viewable area imaged by the image system 10 undergoing optical calibration.

Generally, the planar grid(s) 420 includes a plurality of fiducial markers. For example, a planar grid may include an array of m×n fiducial markers, where m and n are integers greater than or equal to 1. Additionally, in some embodiments, fiducial markers may not be present or may be of a different size to indicate a particular location on the planar grid 420. The planar grid 420 can be positioned such that it is evenly backlit by diffuse light generated by the light source 418. During optical calibration, the backlit planar grid(s) 420 provide a relatively high contrast such that cameras of the image system 10 can capture images including image data representative of the backlit planar grid(s) 420 for MDF pose calculation purposes.

In some implementations, the calibration device 400 may include a red-green-blue-depth (RGBD) camera 422. The RGBD camera 422 can capture depth image data and/or color image data. The housing 401 may include one or more apertures defined within a body of the housing 401. A camera lens of the RGBD camera 422 may oriented with the one or more apertures such that the camera lens may capture image data representing an environment external to the calibration device 400.

As described with respect to FIGS. 6A and 6B below, the calibration device 400 may also include a motor 424 that can rotate the lidar sensor 404. In example implementations, the motor 424 can include a stator, a rotor, and a shaft that is affixed to the rotor. The stator can drive the rotor, which drives the shaft, for rotation purposes. The other side of the shaft may be affixed to the lidar sensor 404 such that the motor 424 can rotate the lidar sensor 404 about an axis. For instance, the motor 424 can cause the lidar sensor 404 can be rotated three-hundred and sixty degrees (360°) about a rotational axis. The motor 424 can receive operational commands from the computer 406.

Figure 5A:
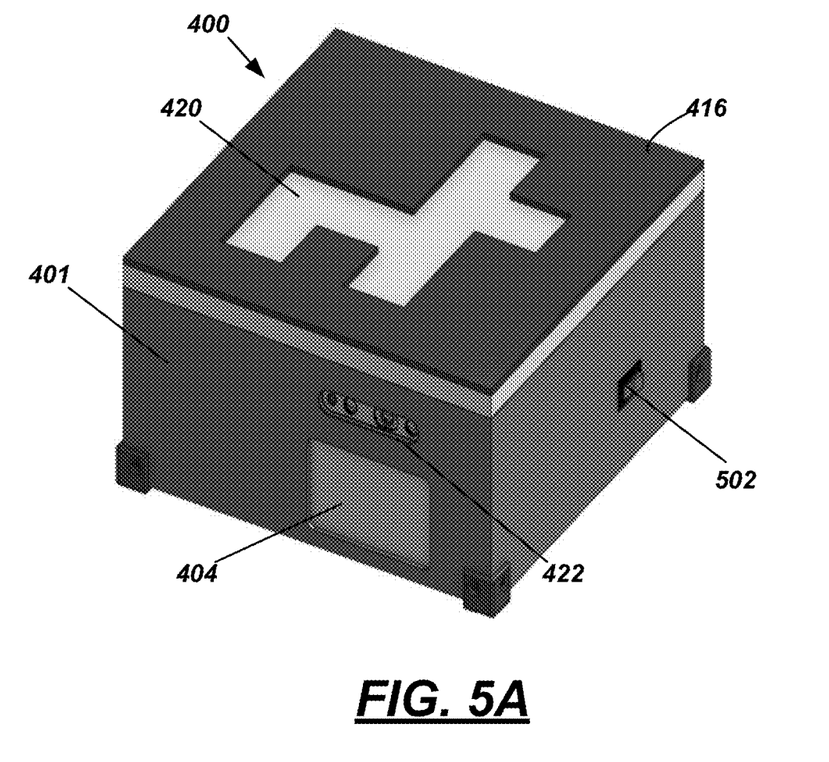
Figure 5B:
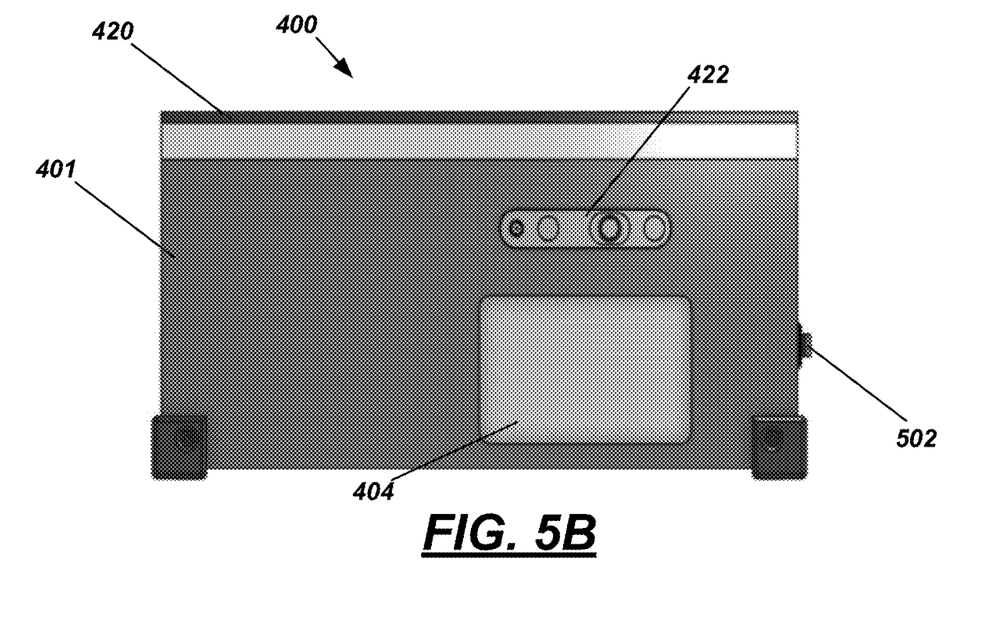

FIGS. 5A and 5B illustrate an example implementation of the calibration device 400. As shown, the calibration device 400 includes the housing 401, the lidar sensor 404, the calibration board 416, and the RGBD camera 422. The calibration device 400 may also include a power interface 502. The power interface 502 may be a button, a switch, or the like that can be actuated to transition a power state of the calibration device 400. For example, the operator may actuate the power interface 502 to cause the calibration device 400 to transition between a powered state and a non-powered state.

Figure 6A:
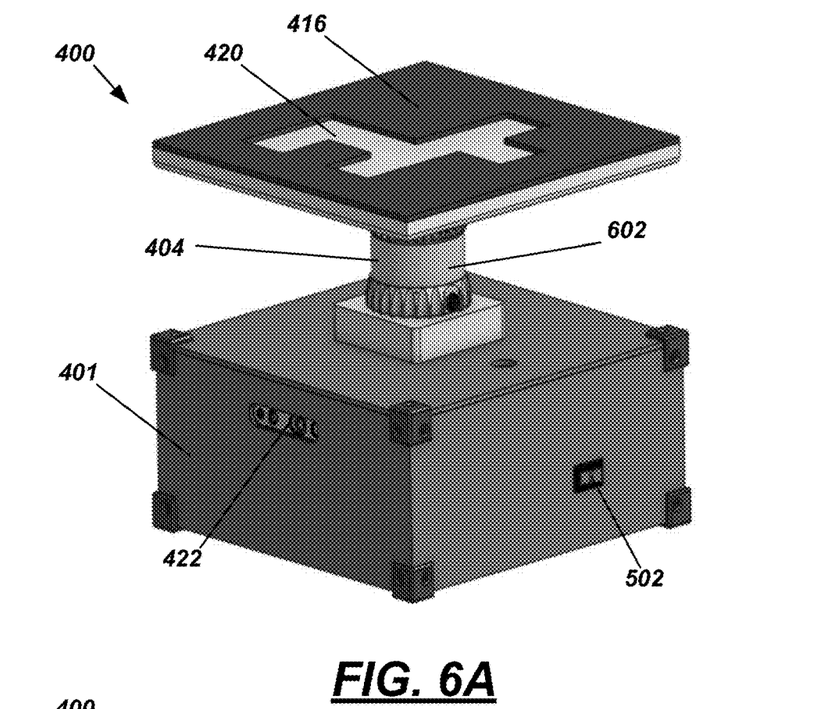
Figure 6B:
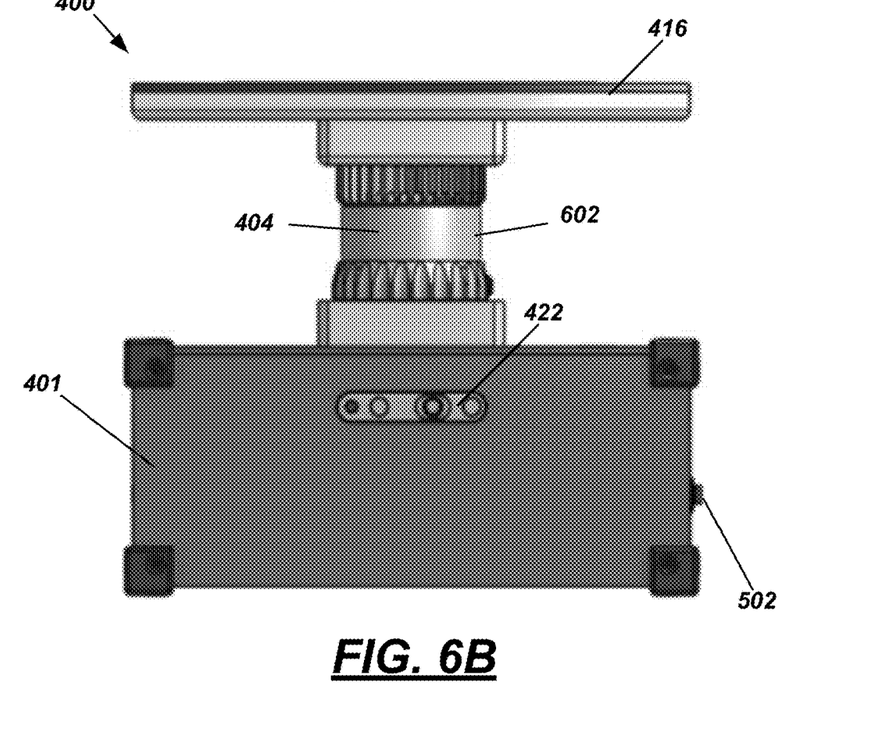

FIGS. 6A and 6B illustrate an example implementation of the calibration device 400. As shown, the calibration device 400 includes the housing 401, the lidar sensor 404, which comprises a rotating lidar sensor 602, the calibration board 416, and the RGBD camera 422. The calibration device 400 may also include a power interface 502. The power interface 502 may be a button, a switch, or the like that can be actuated to transition a power state of the calibration device 400. For example, the operator may actuate the power interface 502 to cause the calibration device 400 to transition between a powered state and a non-powered state. As discussed above, the rotating lidar sensor 602 can rotate three-hundred and sixty degrees (360°) about the rotational axis. As shown, one side of the rotating lidar sensor 602 can be affixed to the housing 401 via a base 604. The calibration board 416 can be affixed to the other side of the rotating lidar sensor 602 via a base 606. In some example implementations, the bases 604, 606 are stationary with respect to the rotating lidar sensor 602. The bases 604, 606 may be constructed from suitable materials, such as the materials used to construct the housing 401.

Figure 7:
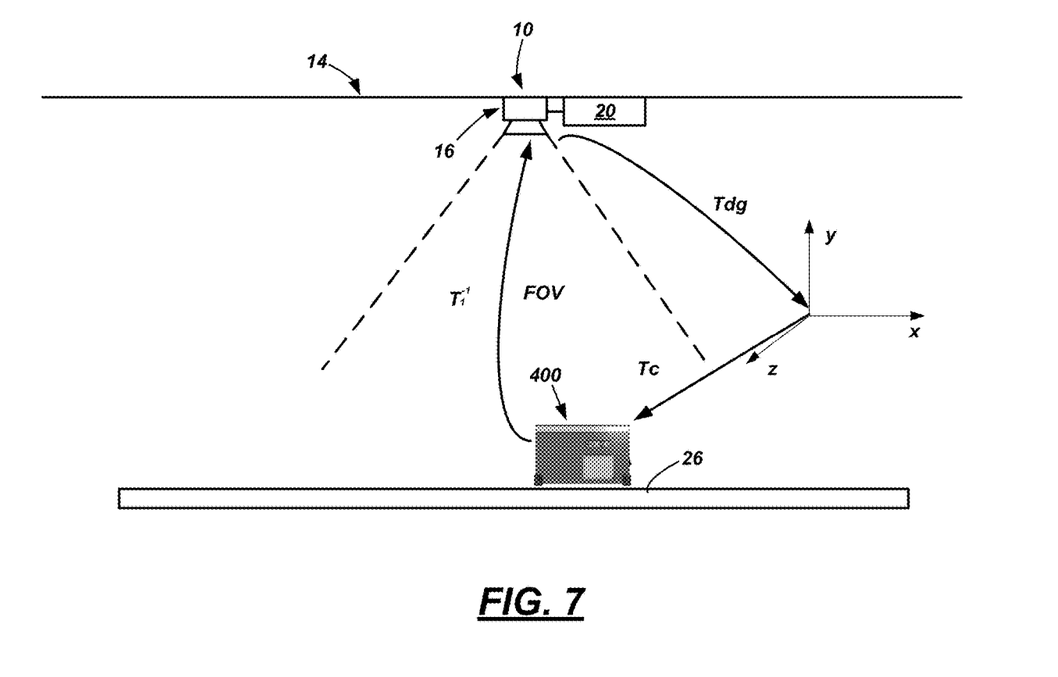
FIG. 7 is an example environmental diagram illustrating the calibration device within a field-of-view of the imaging system of FIG. 1.

FIG. 7 illustrates an example environment in which the calibration device 400 is located within the structure 14. As shown, the image system 10 can be affixed to the structure 14 and oriented to capture image data representing the calibration device 400 when the calibration device 400 enters a frame-of-view (FOV) of the camera 16. The calibration device 400 can travel along the floor 26. In some implementations, the calibration device 400 may be attached to an automated vehicle, e.g., robot, to allow the calibration device 400 to traverse the structure 14. In other implementations, one or more operators handle, e.g., carry, the calibration device 400 while traversing through the structure 14.

Initially, the calibration device 400 operates performs a Simultaneous Localization and Mapping (SLAM) procedure to generate a map of the structure 14. For instance, the computer 406 can use the SLAM procedure to generate the map of the structure 14 based on data received by the lidar sensor 404 and/or RGBD camera 422. The calibration device 400 can use any suitable SLAM procedures to generate a map of the structure 14. For example, the SLAM procedures may comprise an Extended Kalman Filter (EKF) SLAM, a Sparse Extended Information Filter (SEIF) SLAM, or an Unscented Kalman filter (UKF) SLAM.

During the map generation process, the calibration device 400 can also localize itself within the environment. During the localization procedure, the computer 402 can compare the estimated localized position to a global coordinate system (see FIG. 7) that corresponds to the structure 14. The global coordinate system may be predetermined and based on the structure 14 layout. The global coordinate system is common to the calibration device 400 and the image system 10.

After the map of the structure 14 has been generated using one or more SLAM procedures, the calibration device 400 can utilize localization procedures to traverse the structure 14 and/or determine a pose estimation of the calibration device 14. The pose estimation can comprise an MDF pose of the calibration device 400 relative to the global coordinate system of the structure 14. For instance, using the localization procedures, the computer 406 determines the MDF pose of the calibration device 400 with respect to the global coordinate system of the structure 14. As discussed above, the MDF pose can comprise six (6) components, including an x-component (x), a y-component (y), a z-component (z), a pitch component (θ), a roll component (ϕ, and a yaw component (ψ), wherein the x-, y-, and z-components are translations according to a Cartesian coordinate system (comprising an X-axis, a Y-axis, and a Z-axis) and the roll, pitch, and yaw components are rotations about X-, Y-, and Z-axes, respectively. The MDF pose of the calibration device 400 relative to the global coordinate system is referenced as $T_C$ in FIG. 7.

As the calibration device 400 enters the FOV of the image system 10, the image system 10 can determine, via the computer 20, the MDF pose of the image system 10 relative to the calibration device 400 is determined. For example, the camera 16 may capture one or more images comprising at least a portion of vehicle 12. The one or more images may comprise both camera image data and/or depth image data that corresponds with features in the camera image data. In an example implementation, the computer 20 determines the MDF pose based on camera image data. The camera image data includes the data representing the planar grid array(s) 420 such that computer 20 can calculate the MDF pose of the camera 16 relative to the calibration vehicle 400, which is represented as $T_1^{-1}$ in FIG. 7. Once the computer 20 determines the MDF pose of the camera 16, the computer 20 transits the MDF pose of the camera 16 to the calibration device 400. In various implementations, the transmitted data is time synchronized such that the computer 406 can determine the corresponding MDF pose data of the calibration device 400. Additionally or alternatively, the transmitted data includes a unique identifier for identifying each camera 16 deployed within the environment.

Using the MDF pose of the calibration device 400 and the corresponding MDF pose of the camera 16 with respect to the calibration device 400, the computer 406 determines a global MDF pose of the camera 16. The global MDF pose of the camera 16, e.g., image system 10, is the MDF pose relative to the global coordinate system corresponding to the structure 14. The computer 406 determines the global MDF pose, which is represented as $T_{dg}$ in FIG. 7, by concatenation of the calibration device 400 MDF pose data and the camera 16 MDF pose data. For instance, the global MDF pose is calculated by performing matrix multiplication using the matrix values representing the calibration device 400 MDF pose data and the camera 16 MDF pose data.

For example, the calculation to obtain $T_{dg}$ is illustrated in Equation 1:

$$T_{dg} = T_c * T_1^{-1} \qquad \text{Equation 1.}$$

It is understood that the process can be extended to each camera affixed to the structure 14. Once the global MDF pose for the camera 16 is calculated, the computer 406 causes the global MDF pose data to be transmitted to the camera 16. The computer 20 can use the global MDF pose data for camera 16 calibration purposes. In some implementations, the computer 20 may receive a command to move the calibration device 400 to a determined waypoint via the wireless transceiver 414 from the image system 10. The determined waypoint may be based on the image system 10 determining an object is in a projected path of the calibration device 400. For instance, the computer 20 may determine a new waypoint based on the object such that the calibration device 400 avoids the object.

Figure 8:
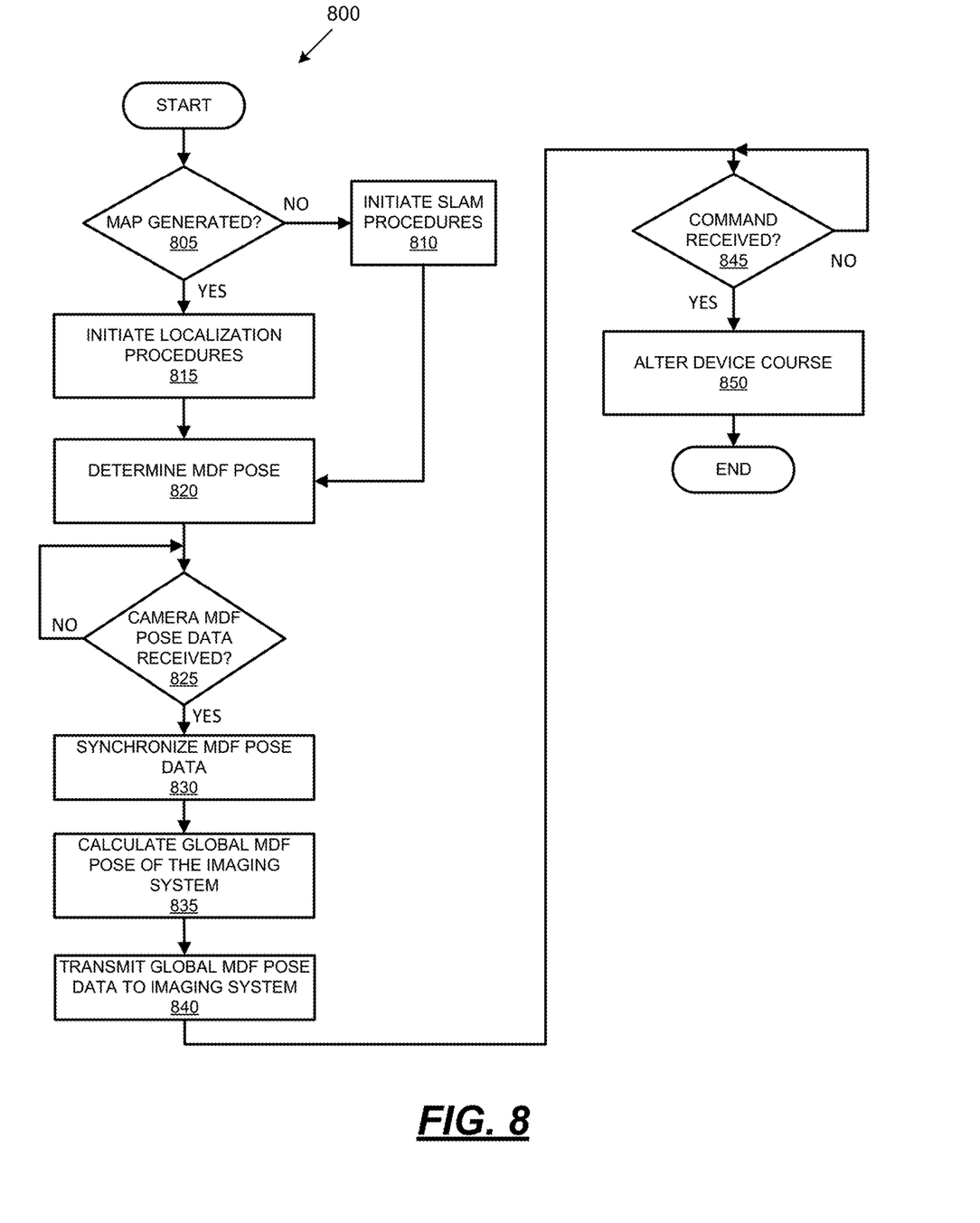
FIG. 8 is a flow diagram illustrating a determining a global pose MDF of a camera of the imaging system.

Turning now to FIG. 8, a flow diagram is shown that illustrates an example process 800 of determining the global MDF pose of a camera, such as the camera 16, of the image system 10. The process 800 comprises software instructions executable by computer 406 (e.g., executable by the one or more processors 408 stored in memory 410). Non-limiting examples of software instructions are illustrated as instructional blocks in the diagram. It will be appreciated that while not necessarily explained explicitly in process 800, other software instructions may be carried out as well. In some instances, process 800 may comprise steps not executed by the computer 406, but by other objects, devices, other computers, etc.

Process 800 may begin at block 805 in which a determination is made whether a map representing the structure 14 has been generated. For example, the computer 406 may determine whether the structure 14 has been previously mapped using SLAM procedures. If the structure 14 has not been previously mapped, the computer 406 initiates the SLAM procedure at block 810. Otherwise, the computer 406 initiates localization procedures such that the computer 406 can determine the MDF pose of the calibration device 400 relative to the global coordinate system corresponding to the structure 14 at block 815. At block 820, the MDF pose of the calibration device 400 is determined based on localization procedures initiated in block 810 or block 815.

At block 825, a determination is made whether MDF pose data for an image system 10, e.g., the camera 16, has been received. If MDF pose data for the image system 10 has not been received, the process 800 returns to block 825. Otherwise, the computer 406 synchronizes, or matches, the MDF pose data for the image system 10 with the corresponding MDF pose data for the calibration device 400 at block 830. In one or more implementations, the computer 406 synchronizes the MDF pose data based on time stamp data.

At block 835, the global MDF pose data for the image system 10 is calculated. As discussed above, the global MDF poses is calculated by performing matrix multiplication using the matrix values representing the calibration device 400 MDF pose data and the camera 16 MDF pose data. At block 840, the global MDF pose data is transmitted to the image system 10. For instance, the computer 406 may provide the global MDF pose data to the wireless transceiver 414 such that the wireless transceiver 414 can transmit the global MDF pose data to the wireless transceiver 22 of the image system 10. The computer 20 can utilize the global MDF pose data for camera 16 calibration purposes.

In some implementations, the process 800 may also include determining whether a command has been received to move the calibration device 400 to another waypoint at block 845. If the command has been received, the movement, e.g., course, of the calibration device 400 is altered such that the calibration device 400 begins to move to the determined waypoint at block 850. Otherwise, the process 800 returns to block 845.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of calculating a global multi-degree of freedom (MDF) pose of a camera affixed to a structure, comprising:
   determining, via a computer of a calibration device, a calibration device MDF pose with respect to a global coordinate system corresponding to the structure;
   receiving, from an image system including the camera, a camera MDF pose with respect to the calibration device, wherein a computer of the image system determines the camera MDF pose based on an image captured by the camera including at least a calibration board affixed to the calibration device;
   calculating, including by time-synchronizing the calibration device MDF pose with the camera MDF pose and performing matrix multiplication, the global MDF pose based on the calibration device MDF pose and the camera MDF pose; and
   transmitting the global MDF pose to the image system such that a computer of the image system can use the global MDF pose for calibration purposes.

2. The method of claim 1, further comprising receiving a command to navigate to a new waypoint.

3. The method of claim 1, wherein the camera is a red-green-blue-depth (RGBD) camera.

4. The method of claim 1, wherein the computer of the image system determines the camera MDF pose using a deep neural network that receives an input image including image data representative of the calibration board.

5. The method of claim 4, wherein the deep neural network is a convolutional neural network (CNN).

6. The method of claim 5, wherein an input layer of the CNN receives the images, wherein an output layer of the CNN yields the MDF pose.

7. The method of claim 1, wherein the calibration board includes one or more grid arrays.

8. The method of claim 7, wherein the one or more grid arrays are arranged to form a fiducial marker.

9. The method of claim 8, wherein the calibration board includes a light source that emits electromagnetic radiation via the fiducial marker.

10. The method of claim 8, wherein determining the calibration device MDF pose further comprises determining the calibration device MDF pose based on sensor data captured by at least one sensor, wherein the sensor data is representative of an environment external to the calibration device.

11. A calibration device, comprising:
a calibration board;
at least one sensor arranged to capture environment data external to the calibration device;
a wireless transceiver; and
a computer communicatively coupled to the at least one sensor and the transceiver, wherein the computer comprises one or more processors and memory storing instructions executable by the one or more processors to cause the one or more processors to:
 determine a calibration device multi-degree of freedom (MDF) pose with respect to a global coordinate system corresponding to a structure based on the environment data captured by the at least one sensor;
 receive, from an image system including a camera, a camera MDF pose with respect to the calibration device, wherein a computer of the image system determines the camera MDF pose based on an image captured by the camera including at least the calibration board;
 calculate, including by time-synchronizing the calibration device MDF pose with the camera MDF pose and performing matrix multiplication, the global MDF pose based on the calibration device MDF pose and the camera MDF pose; and
 transmit the global MDF pose to the image system such that a computer of the image system can use the global MDF pose for calibration purposes.

12. The calibration device of claim 11, wherein the instructions further cause the one or more processors to receive a command to navigate to a new waypoint.

13. The calibration device of claim 11, wherein the camera is a red-green-blue-depth (RGBD) camera.

14. The calibration device of claim 11, wherein the computer of the image system determines the camera MDF pose using a deep neural network that receives an input image including image data representative of the calibration board.

15. The calibration device of claim 14, wherein the deep neural network is a convolutional neural network (CNN).

16. The calibration device of claim 15, wherein an input layer of the CNN receives the one or more images, wherein an output layer of the CNN yields the MDF pose.

17. The calibration device of claim 11, wherein the calibration board includes one or more grid arrays.

18. The calibration device of claim 17, wherein the one or more grid arrays are arranged to form a fiducial marker.

19. The calibration device of claim 18, wherein the calibration board includes a light source that emits electromagnetic radiation via the fiducial marker.

20. The calibration device of claim 11, wherein the at least one sensor comprises a lidar sensor.

* * * * *